United States Patent
Yamada

(10) Patent No.: US 8,194,318 B2
(45) Date of Patent: Jun. 5, 2012

(54) TELESCOPE OPTICAL SYSTEM

(75) Inventor: Kenji Yamada, Yachiyo (JP)

(73) Assignee: Nikon Vision Co., Ltd., Tokyo (JP)

(*) Notice: Subject to any disclaimer, the term of this patent is extended or adjusted under 35 U.S.C. 154(b) by 0 days.

(21) Appl. No.: 12/841,284

(22) Filed: Jul. 22, 2010

(65) Prior Publication Data

US 2010/0284068 A1    Nov. 11, 2010

Related U.S. Application Data

(63) Continuation-in-part of application No. PCT/JP2009/050791, filed on Jan. 14, 2009.

(30) Foreign Application Priority Data

Jan. 23, 2008 (JP) .................... 2008-012175

(51) Int. Cl.
*G02B 27/64* (2006.01)
*G02B 21/02* (2006.01)

(52) U.S. Cl. ........ 359/557; 359/399; 359/407; 359/554; 359/661

(58) Field of Classification Search .......... 359/554–557, 359/676–690, 399, 407, 656–661
See application file for complete search history.

(56) References Cited

U.S. PATENT DOCUMENTS

| | | | |
|---|---|---|---|
| 4,496,231 A * | 1/1985 | Heitmann et al. | 396/233 |
| 4,978,205 A | 12/1990 | Sato | |
| 5,323,270 A | 6/1994 | Sato | |
| 5,442,486 A * | 8/1995 | Sato | 359/690 |
| 5,708,890 A * | 1/1998 | Nakano | 396/428 |
| 5,757,555 A | 5/1998 | Sato | |
| 6,072,630 A | 6/2000 | Yano | |
| 6,091,910 A * | 7/2000 | Mihara | 396/373 |
| 6,118,585 A | 9/2000 | Kanai | |
| 6,226,123 B1 | 5/2001 | Kanai et al. | |
| 6,377,399 B1 | 4/2002 | Yanari | |
| 6,781,755 B2 | 8/2004 | Yoneyama | |
| 2003/0048534 A1 | 3/2003 | Yoneyama | |

FOREIGN PATENT DOCUMENTS

| | | |
|---|---|---|
| JP | 2-234115 A | 9/1990 |
| JP | 4-238311 A | 8/1992 |
| JP | 9-145996 | 6/1997 |
| JP | 10-186228 A | 7/1998 |
| JP | 11-194262 A | 7/1999 |
| JP | 11-194304 A | 7/1999 |
| JP | 11-271609 A | 10/1999 |
| JP | 2003-57537 A | 2/2003 |
| JP | 2003-149550 A | 5/2003 |

* cited by examiner

*Primary Examiner* — Thong Nguyen
(74) *Attorney, Agent, or Firm* — Miles & Stockbridge P.C.

(57) ABSTRACT

A telescope optical system TL comprising, in order from an object side: an objective lens 1; an erecting prism 2; and an eyepiece 3; the objective lens 1 comprising, in order from the object side, a first lens group G1 having positive refractive power, a second lens group G2 having negative refractive power, and a third lens group G3 having positive refractive power, focusing being carried out by moving the second lens group G2 along an optical axis, and an image position being movable by moving the third lens group G3 in a direction perpendicular to the optical axis, thereby providing a telescope optical system having optimum optical performance for a telescope.

6 Claims, 16 Drawing Sheets

TELESCOPE OPTICAL SYSTEM

CROSS-REFERENCE TO RELATED APPLICATION

This application is a continuation-in-part of International Application No. PCT/JP2009/050791 filed Jan. 14, 2009.

TECHNICAL FIELD

The present invention relates to a telescope optical system.

BACKGROUND ART

Although a telescope is mainly used for observing an enlarged image of a distant object, when a vibration is transmitted to the telescope by a so-called "hand-shake", the image is vibrated to become difficult to be observed. As for the measures against a hand-shake, for example, a large number of vibration reduction lenses for cameras are developed (for example, see Japanese Patent Application Laid-Open No. 2-234115). Moreover, telescopes equipped with a vibration reduction function are developed (for example, see Japanese Patent Application Laid-Open No. 10-186228).

However, the vibration reduction telescope disclosed in Japanese Patent Application Laid-Open No. 10-186228 does not disclose how to carry out focusing. Even if focusing is carried out by moving a vibration reduction lens having negative power along the optical axis, there has been a problem that the mechanism becomes terribly complicated. On the other hand, configuration of the vibration reduction lens for a camera disclosed in Japanese Patent Application Laid-Open No. 2-234115 does not include an erection prism, which is indispensable for a telescope, so that there has been a problem that it cannot be used as an objective lens of a telescope.

DISCLOSURE OF THE INVENTION

The present invention is made in view of aforementioned problems, and has an object to provide a telescope optical system having optimum optical performance for a telescope.

In order to solve the problems, a first aspect of the present invention provides a telescope optical system comprising, in order from an object side: an objective lens; an erecting prism; and an eyepiece; the objective lens comprising, in order from the object side, a first lens group having positive refractive power, a second lens group having negative refractive power, and a third lens group having positive refractive power, the first lens group being disposed, in order from the object side, a negative lens, a positive lens, and a positive lens, focusing being carried out by moving the second lens group along an optical axis, an image position being movable by moving the third lens group in a direction perpendicular to the optical axis, and the following conditional expression (1) being satisfied:

$$1.5 < f1/(-f2) < 4 \qquad (1)$$

where f1 denotes a focal length of the first lens group, and f2 denotes a focal length of the second lens group.

In the first aspect of the present invention, it is preferable that the second lens group includes a positive lens and a negative lens, and the third lens group includes a positive lens and a negative lens.

In the first aspect of the present invention, it is preferable that an optical system composed of the first lens group and the second lens group is substantially an afocal system.

According to a second aspect of the present invention, there is provided a telescope optical system used in a telescope for making enlarged observation of an object to be observed with being placed on or fixed to a telescope holder in a field, the telescope optical system comprising, in order from an object side: an objective lens; an erecting prism; and an eyepiece; the objective lens comprising, in order from the object side, a first lens group having positive refractive power, a second lens group having negative refractive power, and a third lens group having positive refractive power, the first lens group being disposed, in order from the object side, a negative lens, a positive lens, and a positive lens, focusing being carried out by moving the second lens group along an optical axis, an image position being movable by moving the third lens group in a direction perpendicular to the optical axis, and the following conditional expression (1) being satisfied:

$$1.5 < f1/(-f2) < 4 \qquad (1)$$

where f1 denotes a focal length of the first lens group, and f2 denotes a focal length of the second lens group.

In the second aspect of the present invention, it is preferable that the second lens group includes a positive lens and a negative lens, and the third lens group includes a positive lens and a negative lens.

In the second aspect of the present invention, it is preferable that an optical system composed of the first lens group and the second lens group is substantially an afocal system.

With constructing the telescope optical system according to the present invention as described above, it becomes possible to provide a telescope optical system having optimum optical performance for a telescope.

EMBODIMENT FOR CARRYING OUT THE INVENTION

Figure 1:
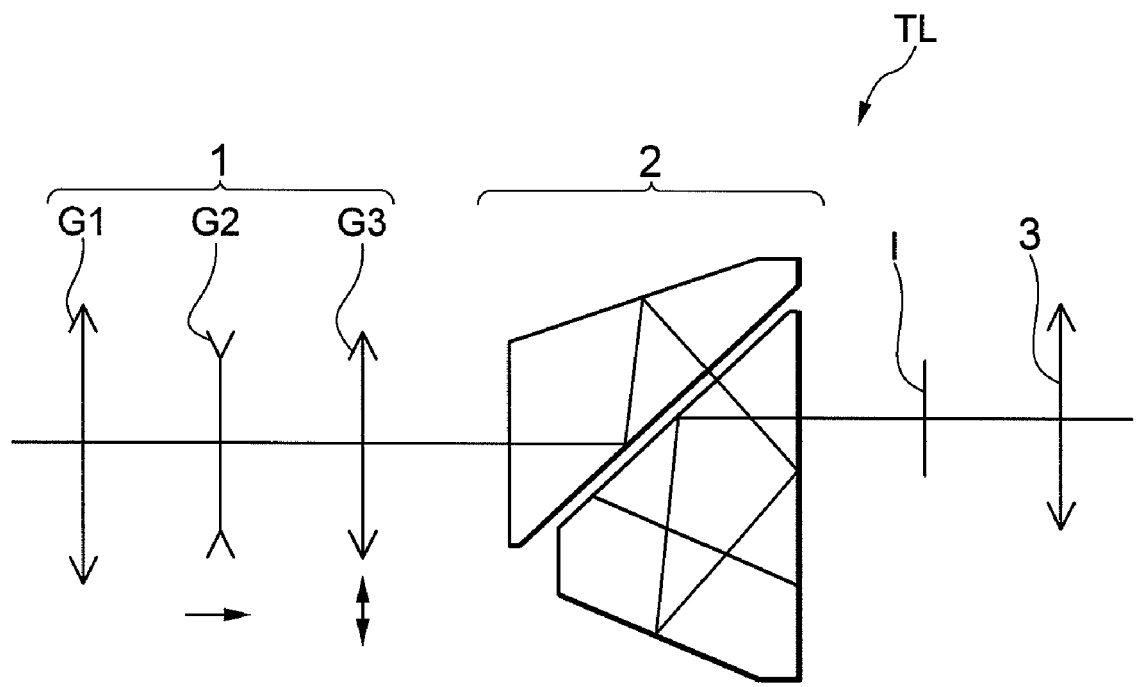
FIG. 1 is a schematic diagram explaining a construction of a telescope optical system.

A preferred embodiment of the present invention is explained with reference to accompanying drawings. FIG. 1 is a schematic diagram explaining a construction of a telescope optical system according to the present embodiment. The telescope optical system TL is composed of, in order from an object side, an objective lens 1, and erecting prism 2, and an eyepiece 3. The objective lens 1 has a function to form an image of an object. The erecting prism 2 has a function to convert the image formed by the objective lens 1 into an erecting image. An observer can observe a primary image I, formed by the objective lens 1 converted by the erecting prism 2 into the erecting image, through the eyepiece 3. In the telescope optical system TL, the objective lens 1 is composed of, in order from the object side, a first lens group G1 having positive refractive power, a second lens group G2 having negative refractive power, and a third lens group G3 having positive refractive power. The construction of the telescope optical system TL is explained below in detail with reference to FIG. 1 together with FIG. 2. Incidentally, FIG. 2 only shows a construction of the objective lens 1 and the erecting prism 2 and the primary image I formed by the objective lens 1 and the erecting prism 2 among the telescope optical system TL, and is corresponding to Example 1 explained later.

Figure 2:
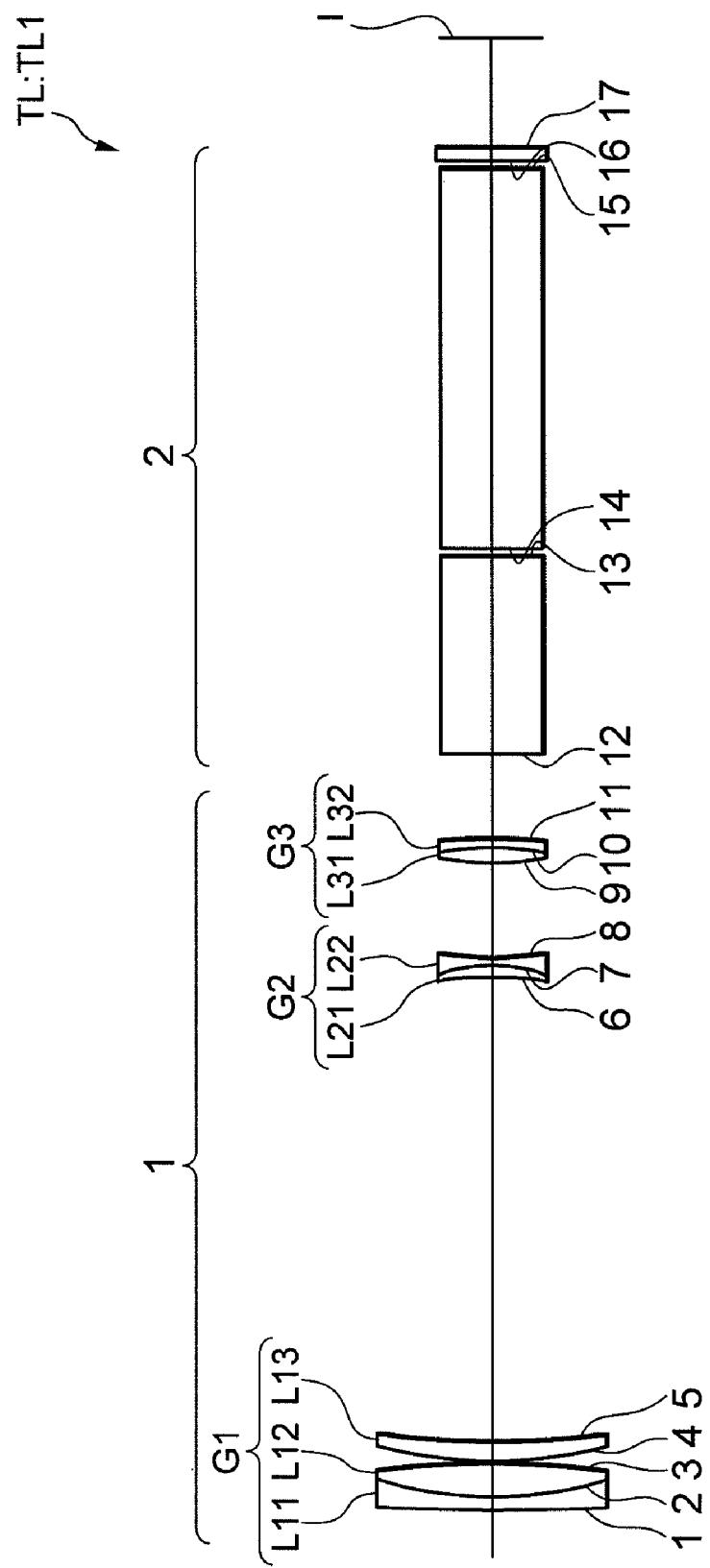
FIG. 2 is a schematic diagram showing a construction of a telescope optical system according to Example 1.

In the objective lens 1 composing the telescope optical system TL shown in FIG. 2, the first lens group G1 is composed of two positive lenses (a double convex lens L12 and a positive meniscus lens L13) and a negative lens (a negative meniscus lens L11), the second lens group G2 is composed of a positive lens (a positive meniscus lens L21) and a negative lens (a double concave lens L22), and the third lens group G3 is composed of a positive lens (a double convex lens L31) and a negative lens (a negative meniscus lens L32). The telescope optical system TL is constructed to carry out focusing by moving the second lens group G2 along an optical axis. Moreover, the telescope optical system TL is constructed to be able to move the position of the image by moving the third lens group G3 in a direction perpendicular to the optical axis. In other words, a vibration reduction function can be realized by moving the third lens group G3 in a direction perpendicular to the optical axis for compensating vibration of the telescope optical system TL.

The telescope optical system TL preferably satisfies the following conditional expression (1):

$$1.5 < f1/(-f2) < 4 \quad (1)$$

where f1 denotes a focal length of the first lens group G1, and f2 denotes a focal length of the second lens group G2.

Conditional expression (1) defines an appropriate range of a ratio of the focal length of the first lens group G1 to that of the second lens group G2 in the objective lens 1. When the ratio f1/(−f2) is equal to or exceeds the upper limit of conditional expression (1), a focal length of the third lens group G3 becomes too short in comparison with a given focal length of the objective lens 1, and a space for disposing the erecting prism 2 cannot be secured, so that it is undesirable. On the other hand, when the ratio f1/(−f2) is equal to or falls below the lower limit of conditional expression (1), the focal length of the third lens group G3 becomes too long, and the total lens length of the telescope optical system TL becomes long. As a result, a telescope equipped with the telescope optical system TL becomes inconvenient for carrying about, so that it is undesirable.

The optical system composed of the first lens group G1 and the second lens group G2 is preferably substantially an afocal system. In other words, it is preferable that parallel light incident on the first lens group G1 is come out from the second lens group G2 as substantially parallel light. With constructing the system described above, even if the pair of the first lens group and the second lens group is replaced by another pair of a first lens group and a second lens group having different afocal magnification, variation in the position of the primary image I becomes small. As a result, it becomes possible to provide a telescope optical system TL having a vibration reduction function and different effective diameter and focal length of the objective lens without replacing the third lens group G3 which is the vibration reduction lens and elements subsequent thereto.

In order to make the telescope optical system TL accomplish high performance, it is common to use anomalous dispersion glass for the positive lens in the objective lens 1 so as to prevent chromatic aberration from being conspicuous upon using a high magnification eyepiece 3. In the telescope optical system TL according to the present embodiment, anomalous dispersion glass is used for at least one of two positive lenses composing the first lens group G1 of the objective lens 1. However, the anomalous dispersion glass is relatively soft, so that it is easy to get scratched and easy to be cracked upon radical change in temperature. Accordingly, the first lens group G1 disposed to the most object side is preferably arranged, in order from the object side, the negative lens, the positive lens and the positive lens so that the aforesaid positive lens is disposed inside where it cannot be directly touched or exposed to the open air.

EXAMPLES

Seven Examples of the abovementioned telescope optical system TL are explained below. Here, the objective lens 1 and the erecting prism 2 composing the telescope optical system TL are explained with showing various values thereof. In each drawing, I denotes a primary image plane which is an image of the object formed by the objective lens 1 and the erecting prism 2.

Example 1

FIG. 2 used in the above explanation is a schematic diagram showing a construction of a telescope optical system TL1 according to Example 1. The telescope optical system TL1 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a negative meniscus lens L11 having a convex surface facing the object side cemented with a double convex lens L12, and a positive meniscus lens L13 having a convex surface facing the object side. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL1 according to Example 1 shown in FIG. 2 are listed in Table 1. In lens data shown in Table 1, the first column "m" shows a number (surface number) attached to each optical surface in order from the object side, the second column "r" shows a radius of curvature of each optical surface, the third column "d" shows a distance (surface distance) between the optical surface and the next optical surface along the optical axis, the fourth column "nd" shows a refractive index at d-line, and the fifth column "vd" shows an Abbe number at d-line. Incidentally, radius of curvature r=0.000 shows a plane surface, and the refractive index of the air nd=1.00000 is omitted. In [Focal Length Data] shown in Table 1, f1 denotes a focal length of the first lens group G1, and f2 denotes a focal length of the second lens group G2. In [Value for Conditional Expression] shown in Table 1, a value corresponding to conditional expression (1) is shown. In various values shown below, "mm" is generally used for the unit of length such as the radius of curvature, the surface distance, and the focal length. However, since similar optical performance can be obtained by an optical system proportionally enlarged or reduced its dimension, the unit is not necessarily to be limited to "mm", and any other suitable unit can be used. The explanation of reference symbols is the same in the other Examples shown below.

TABLE 1

[Lens Data]

| m | r | d | nd | vd |
|---|---|---|---|---|
| 1 | 861.000 | 3.500 | 1.62004 | 36.3 |
| 2 | 114.216 | 9.500 | 1.51680 | 64.1 |
| 3 | −292.560 | 0.500 | | |
| 4 | 121.400 | 6.000 | 1.51680 | 64.1 |
| 5 | 302.200 | 132.357 | | |
| 6 | −135.380 | 4.000 | 1.72825 | 28.3 |
| 7 | −43.874 | 2.000 | 1.62374 | 47.1 |
| 8 | 90.100 | 27.593 | | |
| 9 | 99.350 | 4.500 | 1.51823 | 58.9 |
| 10 | −82.480 | 2.000 | 1.64769 | 33.9 |
| 11 | −310.750 | 24.113 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |
| 16 | 0.000 | 3.000 | 1.51680 | 64.1 |
| 17 | 0.000 | 31.400 | | |

[Focal Length Data]

f1 = 240
f2 = −100

[Value for Conditional Expression]

(1) f1/(−f2) = 2.4

Figure 3:
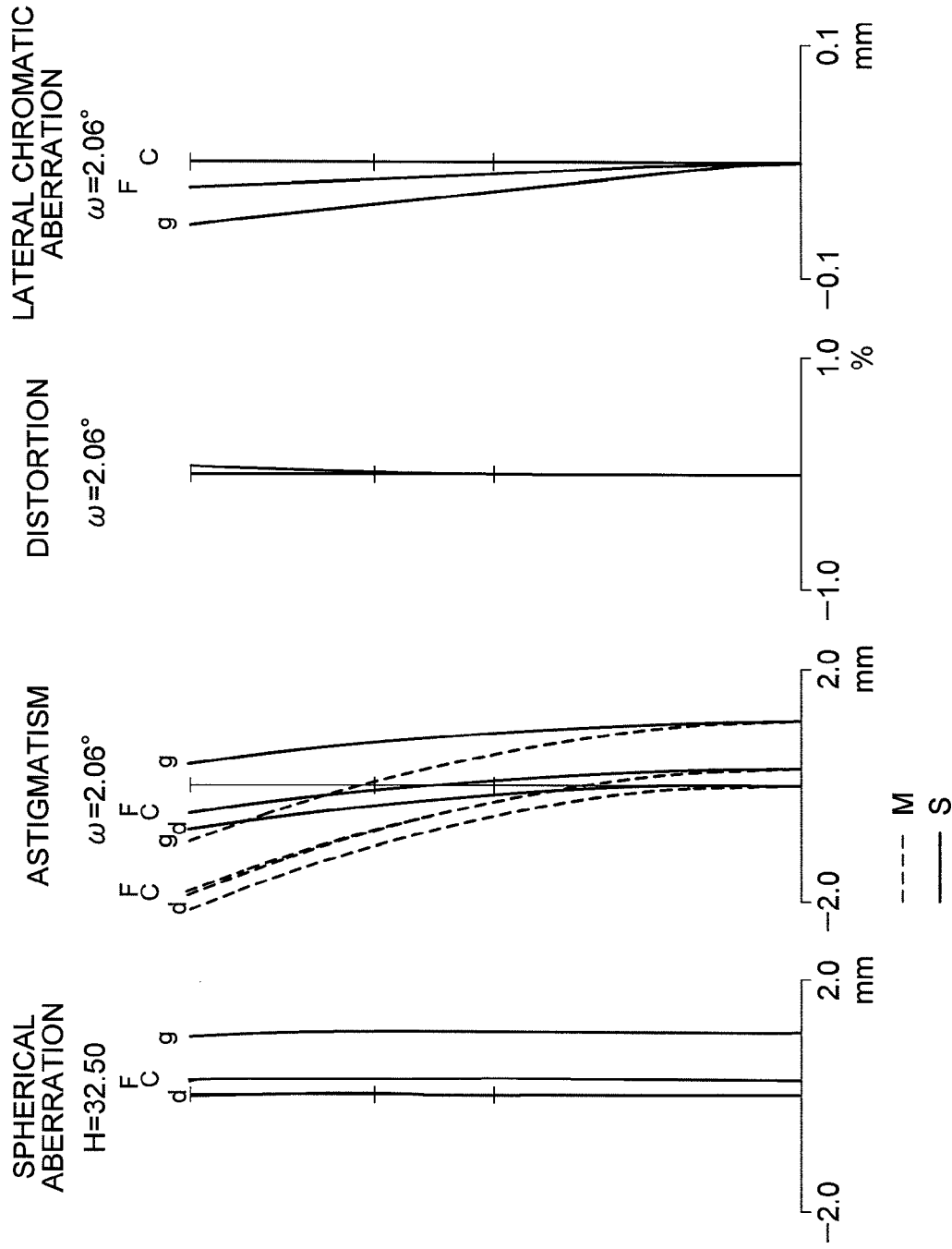
FIG. 3 shows graphs showing various aberrations of the telescope optical system according to Example 1.

As shown above, Example 1 satisfies conditional expression (1). FIG. 3 shows graphs regarding Example 1 showing various aberrations such as spherical aberration, astigmatism, distortion and lateral chromatic aberration with respect to d-line (λ=587.562 nm), g-line (λ=435.835 nm), F-line (λ=486.133 nm) and C-line (λ=656.273 nm). In respective graphs showing spherical aberration, the height H from the optical axis is shown. In respective graphs showing astigmatism, distortion and lateral chromatic aberration, a half angle of view ω is shown. In graphs showing astigmatism, a broken line indicates a meridional image plane M, and a solid line indicates a sagittal image plane S. The above-described explanations regarding various aberration graphs are the same as the other Examples shown below.

As is apparent from the respective graphs shown in FIG. 3, Example 1 shows superb optical performance as a result of good corrections to various aberrations.

Example 2

Figure 4:
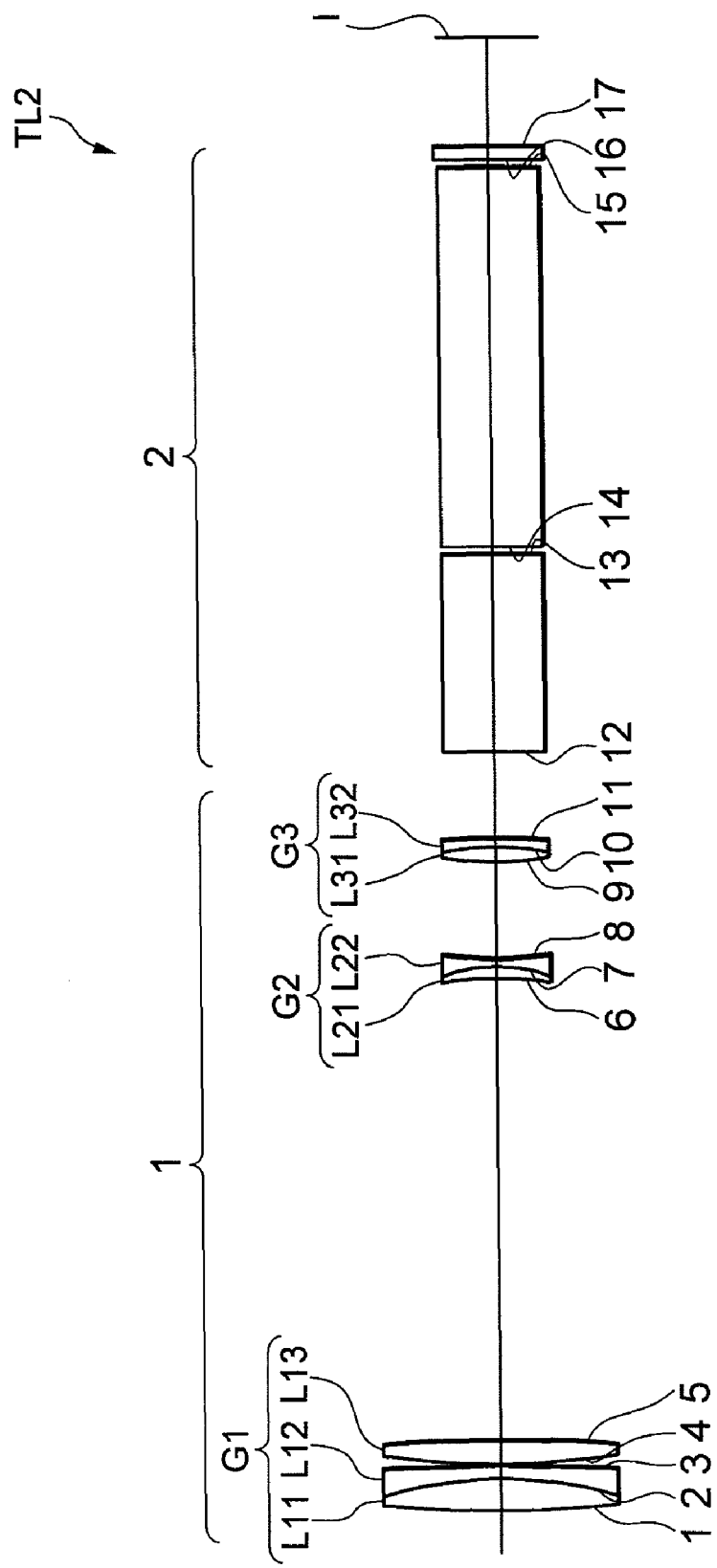
FIG. 4 is a schematic diagram showing a construction of a telescope optical system according to Example 2.

Then, a telescope optical system TL2 shown in FIG. 4 is explained as Example 2. The telescope optical system TL2 shown in FIG. 4 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a double convex lens L11 cemented with a negative meniscus lens L12 having a concave surface facing the object side, and a double convex lens L13. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL2 according to Example 2 are listed in Table 2.

TABLE 2

[Lens Data]

| m | r | d | nd | vd |
|---|---|---|---|---|
| 1 | 387.000 | 9.000 | 1.51680 | 64.1 |
| 2 | −117.777 | 3.500 | 1.62004 | 36.3 |
| 3 | −1108.690 | 0.500 | | |
| 4 | 222.500 | 6.500 | 1.51680 | 64.1 |
| 5 | −596.140 | 132.447 | | |
| 6 | −135.380 | 4.000 | 1.72825 | 28.3 |
| 7 | −43.874 | 2.000 | 1.62374 | 47.1 |
| 8 | 90.100 | 27.651 | | |
| 9 | 99.350 | 4.500 | 1.51823 | 58.9 |
| 10 | −82.480 | 2.000 | 1.64769 | 33.9 |
| 11 | −310.750 | 24.200 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |
| 16 | 0.000 | 3.000 | 1.51680 | 64.1 |
| 17 | 0.000 | 31.400 | | |

[Focal Length Data]

f1 = 240
f2 = −100

[Value for Conditional Expression]

(1) f1/(−f2) = 2.4

Figure 5:
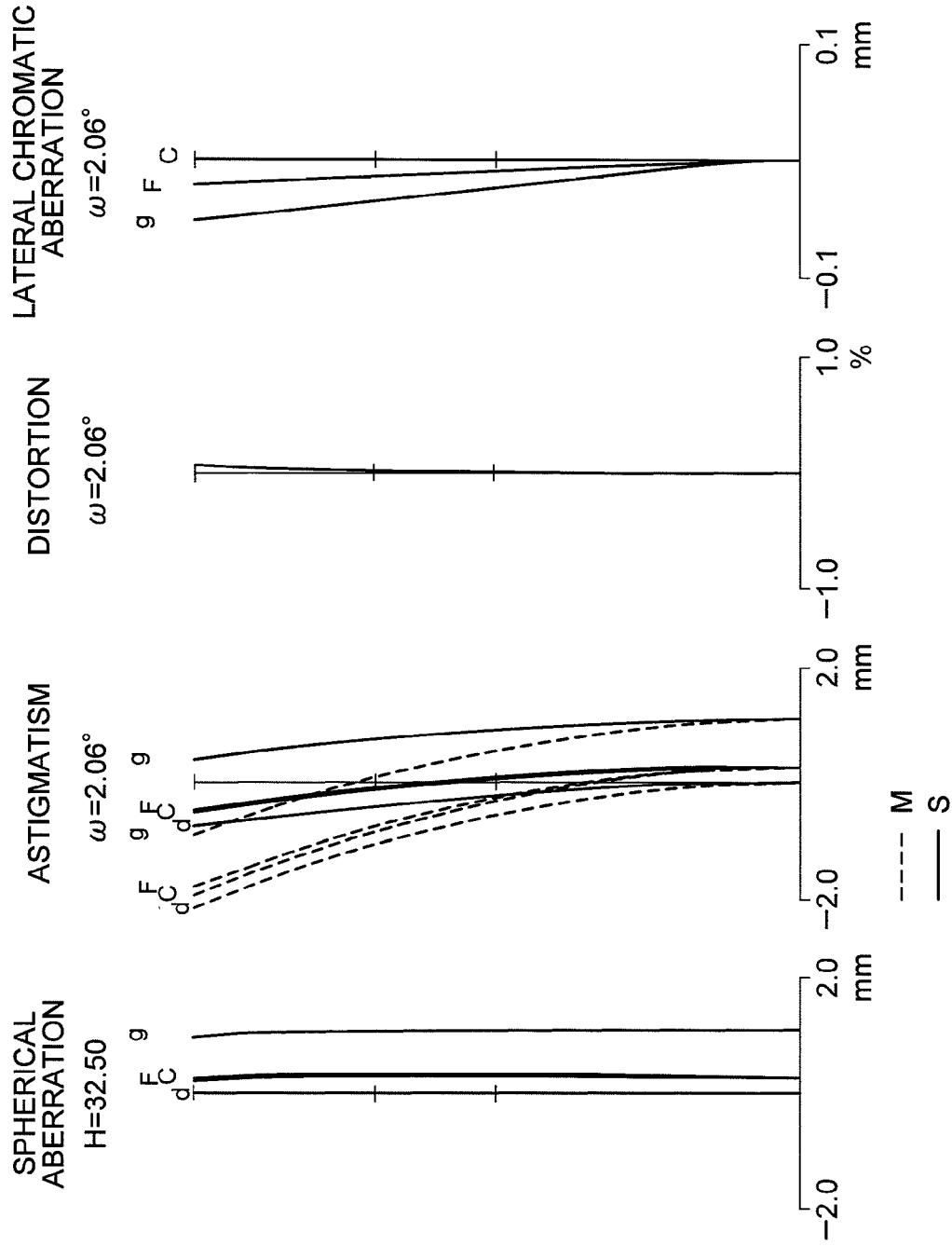
FIG. 5 shows graphs showing various aberrations of the telescope optical system according to Example 2.

As shown above, Example 2 satisfies conditional expression (1). FIG. 5 shows graphs regarding Example 2 showing various aberrations. As is apparent from the respective graphs shown in FIG. 5, Example 2 shows superb optical performance as a result of good corrections to various aberrations.

Example 3

Figure 6:
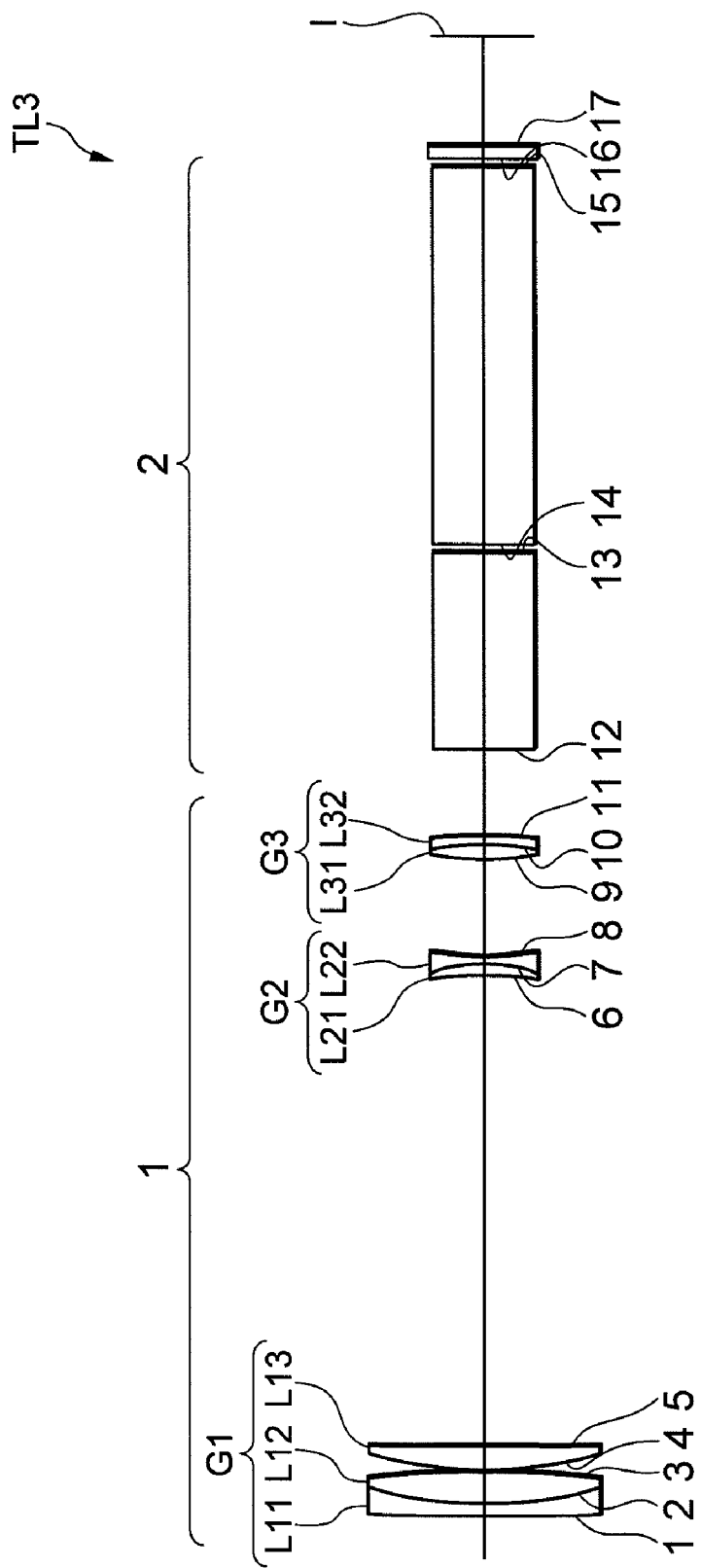
FIG. 6 is a schematic diagram showing a construction of a telescope optical system according to Example 3.

Then, a telescope optical system TL3 shown in FIG. 6 is explained as Example 3. The telescope optical system TL3 shown in FIG. 6 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a negative meniscus lens L11 having a convex surface facing the object side cemented with a double convex lens L12, and a positive meniscus lens L13 having a convex surface facing the object side. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL3 according to Example 3 are listed in Table 3.

TABLE 3

[Lens Data]

| m | r | d | nd | vd |
|---|---|---|---|---|
| 1 | 4129.730 | 3.500 | 1.72000 | 50.2 |
| 2 | 127.270 | 9.000 | 1.49782 | 82.5 |
| 3 | −281.039 | 0.500 | | |
| 4 | 123.340 | 7.000 | 1.49782 | 82.5 |
| 5 | 4129.730 | 135.178 | | |
| 6 | −135.380 | 4.000 | 1.72825 | 28.3 |
| 7 | −43.874 | 2.000 | 1.62374 | 47.1 |
| 8 | 90.100 | 27.948 | | |
| 9 | 99.350 | 4.500 | 1.51823 | 58.9 |
| 10 | −82.480 | 2.000 | 1.64769 | 33.9 |
| 11 | −310.750 | 24.635 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |
| 16 | 0.000 | 3.000 | 1.51680 | 64.1 |
| 17 | 0.000 | 31.400 | | |

[Focal Length Data]

f1 = 240
f2 = −100

[Value for Conditional Expression]

(1) f1/(−f2) = 2.4

Figure 7:
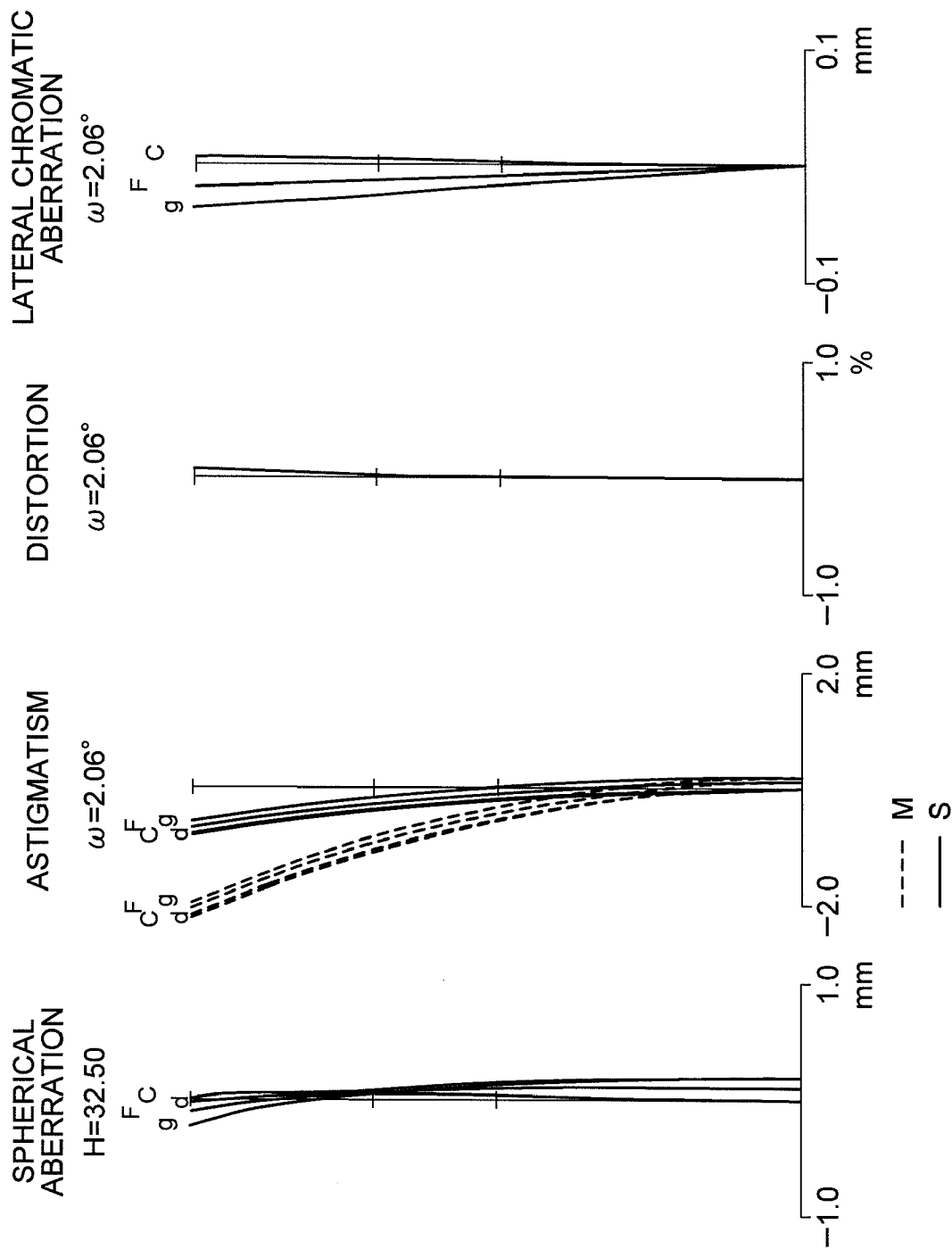
FIG. 7 shows graphs showing various aberrations of the telescope optical system according to Example 3.

As shown above, Example 3 satisfies conditional expression (1). FIG. 7 shows graphs regarding Example 3 showing various aberrations. As is apparent from the respective graphs shown in FIG. 7, Example 3 shows superb optical performance as a result of good corrections to various aberrations.

Example 4

Figure 8:
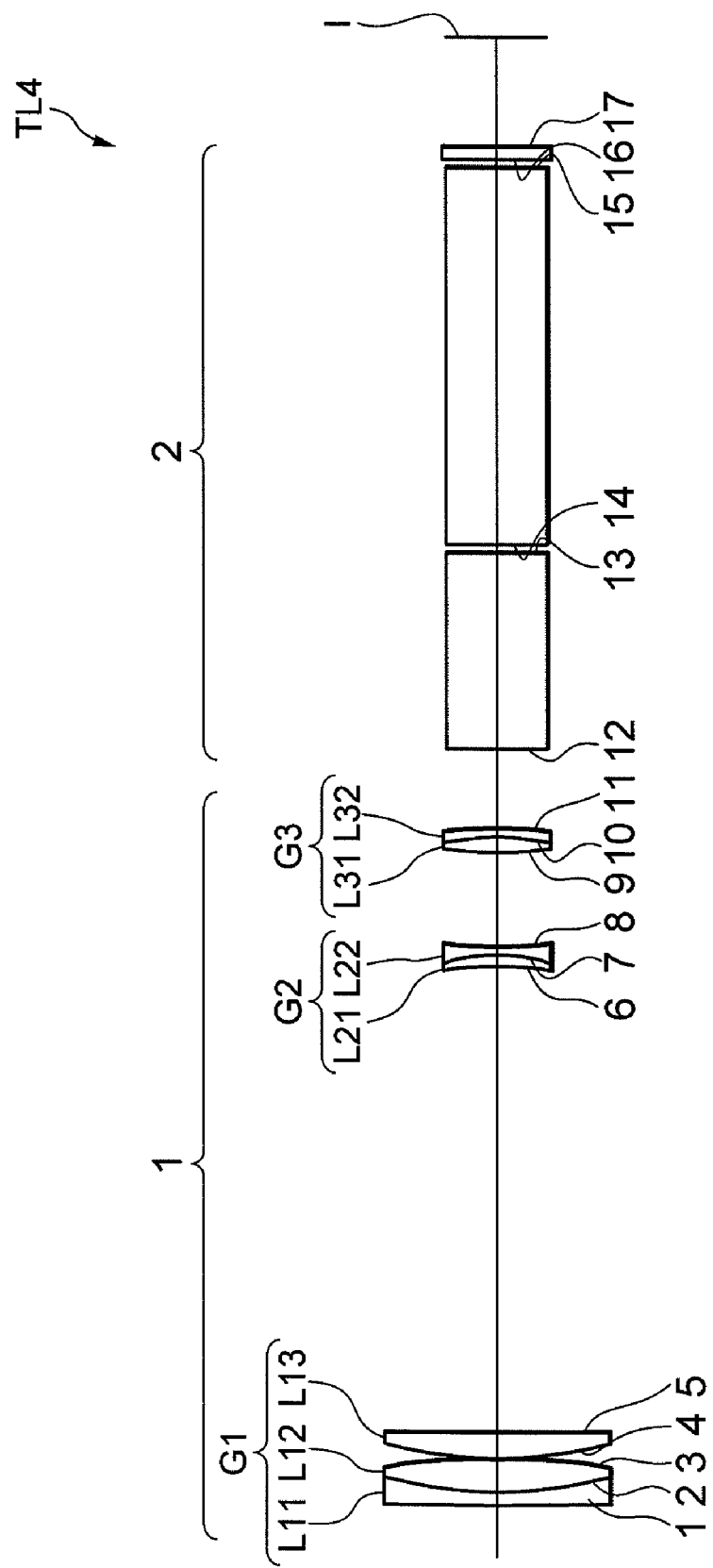
FIG. 8 is a schematic diagram showing a construction of a telescope optical system according to Example 4.

Then, a telescope optical system TL4 shown in FIG. 8 is explained as Example 4. The telescope optical system TL4 shown in FIG. 8 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a negative meniscus lens L11 having a convex surface facing the object side cemented with a double convex lens L12, and a positive meniscus lens L13 having a convex surface facing the object side. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL4 according to Example 4 are listed in Table 4.

TABLE 4

[Lens Data]

| m | r | d | nd | vd |
|---|---|---|---|---|
| 1 | 2120.571 | 3.500 | 1.74443 | 49.5 |
| 2 | 131.600 | 9.000 | 1.49782 | 82.5 |
| 3 | −281.039 | 0.500 | | |
| 4 | 122.960 | 7.500 | 1.49782 | 82.5 |
| 5 | 2723.580 | 134.954 | | |
| 6 | −135.380 | 4.000 | 1.72825 | 28.3 |
| 7 | −43.874 | 2.000 | 1.62374 | 47.1 |
| 8 | 90.100 | 27.594 | | |
| 9 | 99.350 | 4.500 | 1.51823 | 58.9 |
| 10 | −82.480 | 2.000 | 1.64769 | 33.9 |
| 11 | −310.750 | 24.114 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |
| 16 | 0.000 | 3.000 | 1.51680 | 64.1 |
| 17 | 0.000 | 31.400 | | |

[Focal Length Data]

f1 = 240
f2 = −100

[Value for Conditional Expression]

(1) f1/(−f2) = 2.4

Figure 9:
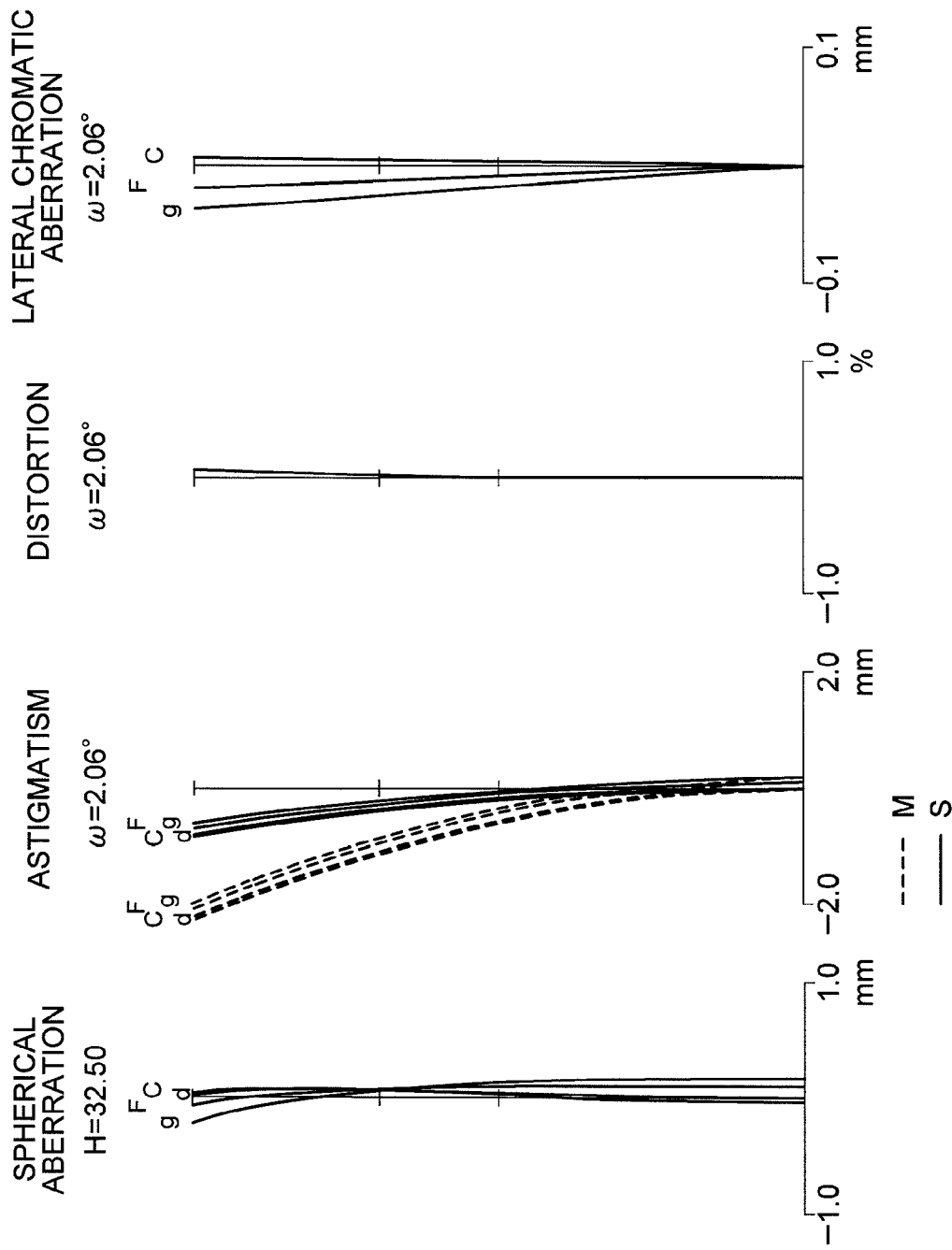
FIG. 9 shows graphs showing various aberrations of the telescope optical system according to Example 4.

As shown above, Example 4 satisfies conditional expression (1). FIG. 9 shows graphs regarding Example 4 showing various aberrations. As is apparent from the respective graphs shown in FIG. 9, Example 4 shows superb optical performance as a result of good corrections to various aberrations.

Example 5

Figure 10:
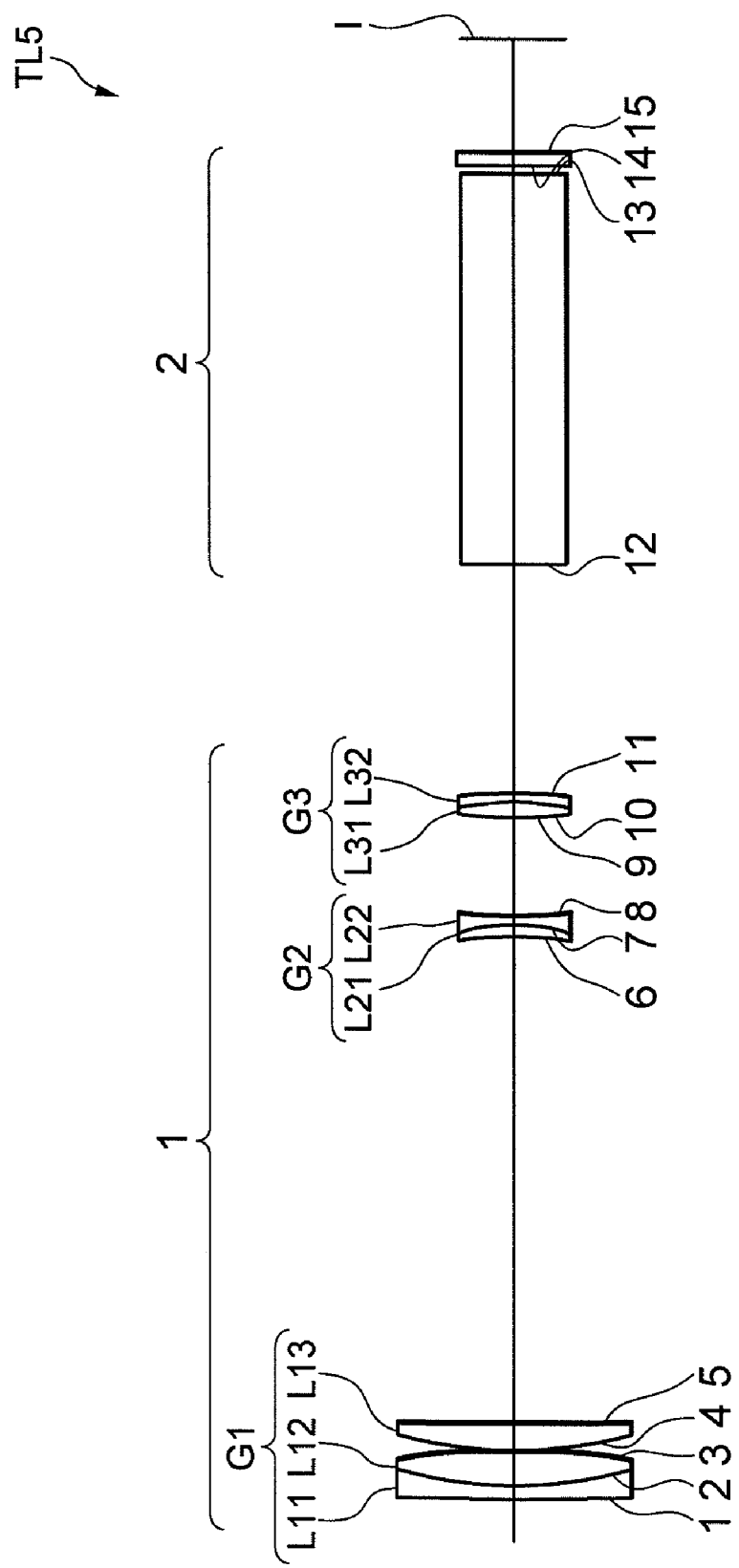
FIG. 10 is a schematic diagram showing a construction of a telescope optical system according to Example 5.

Then, a telescope optical system TL5 shown in FIG. 10 is explained as Example 5. The telescope optical system TL5 shown in FIG. 10 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a negative meniscus lens L11 having a convex surface facing the object side cemented with a double convex lens L12, and a positive meniscus lens L13 having a convex surface facing the object side. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL5 are listed in Table 5.

TABLE 5

[Lens Data]

| m | r | d | nd | vd |
|---|---|---|---|---|
| 1 | 4129.730 | 3.500 | 1.72000 | 50.2 |
| 2 | 127.270 | 9.000 | 1.49782 | 82.5 |
| 3 | −281.039 | 0.500 | | |
| 4 | 123.340 | 7.000 | 1.49782 | 82.5 |
| 5 | 4129.730 | 135.170 | | |
| 6 | −135.380 | 4.000 | 1.72825 | 28.3 |
| 7 | −43.874 | 2.000 | 1.62374 | 47.1 |

TABLE 5-continued

| | | | | |
|---|---|---|---|---|
| 8 | 90.100 | 28.112 | | |
| 9 | 96.500 | 4.500 | 1.52249 | 59.6 |
| 10 | −81.720 | 2.000 | 1.64769 | 33.9 |
| 11 | −351.000 | 64.330 | | |
| 12 | 0.000 | 107.720 | 1.51680 | 64.1 |
| 13 | 0.000 | 3.000 | | |
| 14 | 0.000 | 3.000 | 1.51680 | 64.1 |
| 15 | 0.000 | 31.400 | | |

[Focal Length Data]

f1 = 240
f2 = −100

[Value for Conditional Expression]

(1) f1/(−f2) = 2.4

Figure 11:
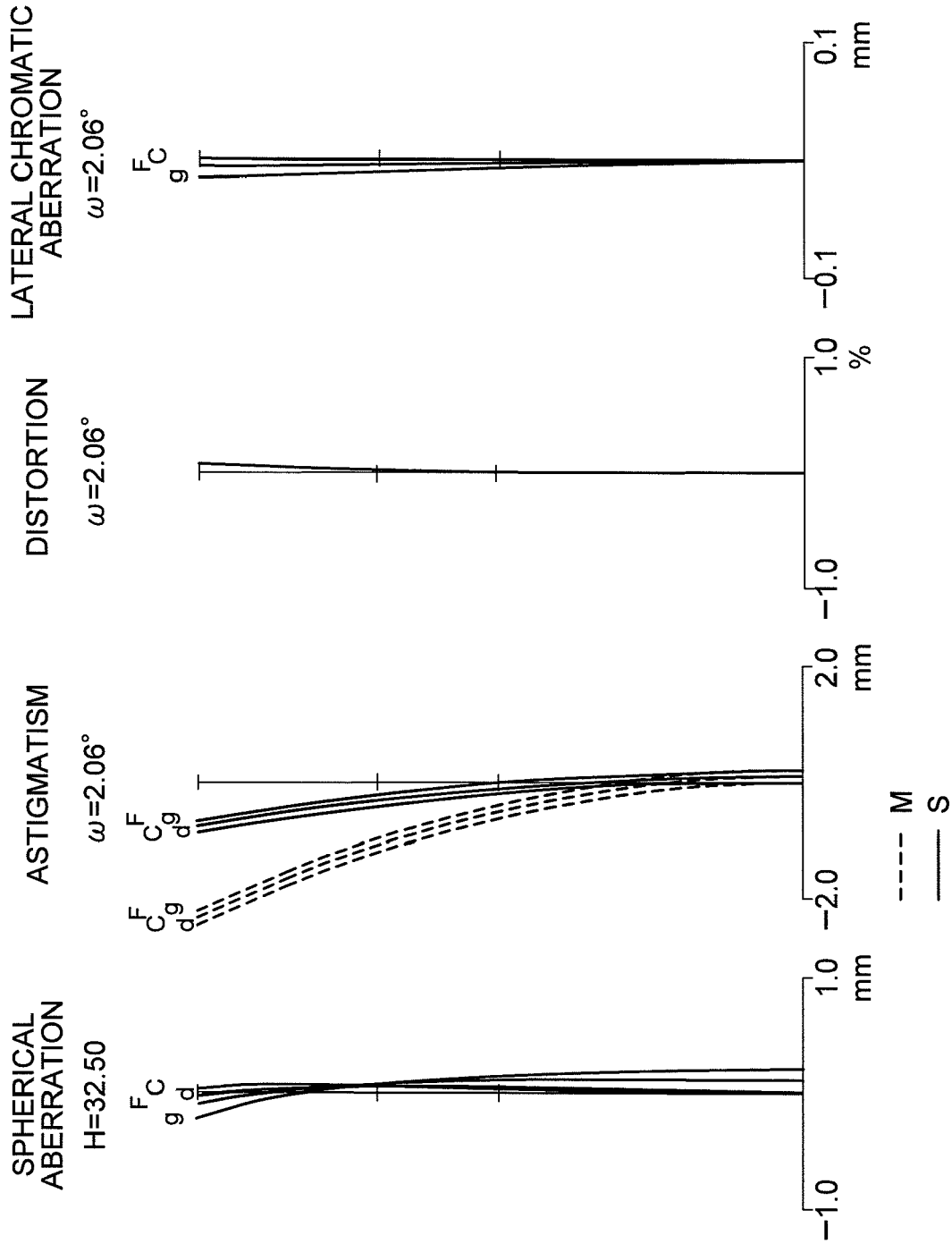
FIG. 11 shows graphs showing various aberrations of the telescope optical system according to Example 5.

As shown above, Example 5 satisfies conditional expression (1). FIG. 11 shows graphs regarding Example 5 showing various aberrations. As is apparent from the respective graphs shown in FIG. 11, Example shows superb optical performance as a result of good corrections to various aberrations.

Example 6

Figure 12:
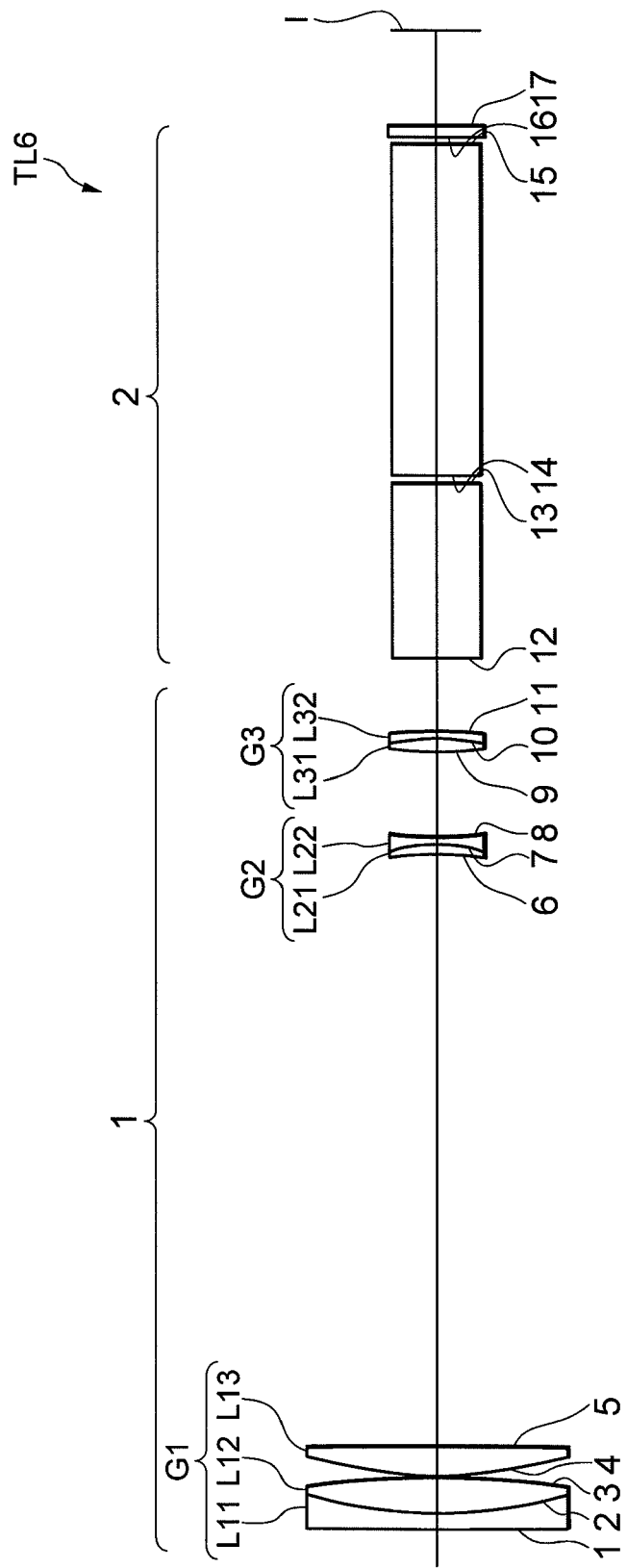
FIG. 12 is a schematic diagram showing a construction of a telescope optical system according to Example 6.

Then, a telescope optical system TL6 shown in FIG. 12 is explained as Example 6. The telescope optical system TL6 shown in FIG. 12 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a plano-concave lens L11 having a plane surface facing the object side and a concave surface facing an image side cemented with double convex lens L12, and a plano-convex lens L13 having a plane surface facing the image side and a convex surface facing the object side. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL6 according to Example 6 are listed in Table 6.

TABLE 6

[Lens Data]

| m | r | d | nd | vd |
|---|---|---|---|---|
| 1 | 0.000 | 4.500 | 1.73350 | 51.1 |
| 2 | 154.115 | 12.000 | 1.49782 | 82.5 |
| 3 | −333.000 | 0.500 | | |
| 4 | 150.348 | 9.500 | 1.49782 | 82.5 |
| 5 | 0.000 | 195.137 | | |
| 6 | −135.380 | 4.000 | 1.72825 | 28.3 |
| 7 | −43.874 | 2.000 | 1.62374 | 47.1 |
| 8 | 90.100 | 27.977 | | |
| 9 | 99.350 | 4.500 | 1.51823 | 58.9 |
| 10 | −82.480 | 2.000 | 1.64769 | 33.9 |
| 11 | −310.750 | 24.621 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |
| 16 | 0.000 | 3.000 | 1.51680 | 64.1 |
| 17 | 0.000 | 31.400 | | |

[Focal Length Data]

f1 = 300
f2 = −100

[Value for Conditional Expression]

(1) f1/(−f2) = 3.0

Figure 13:
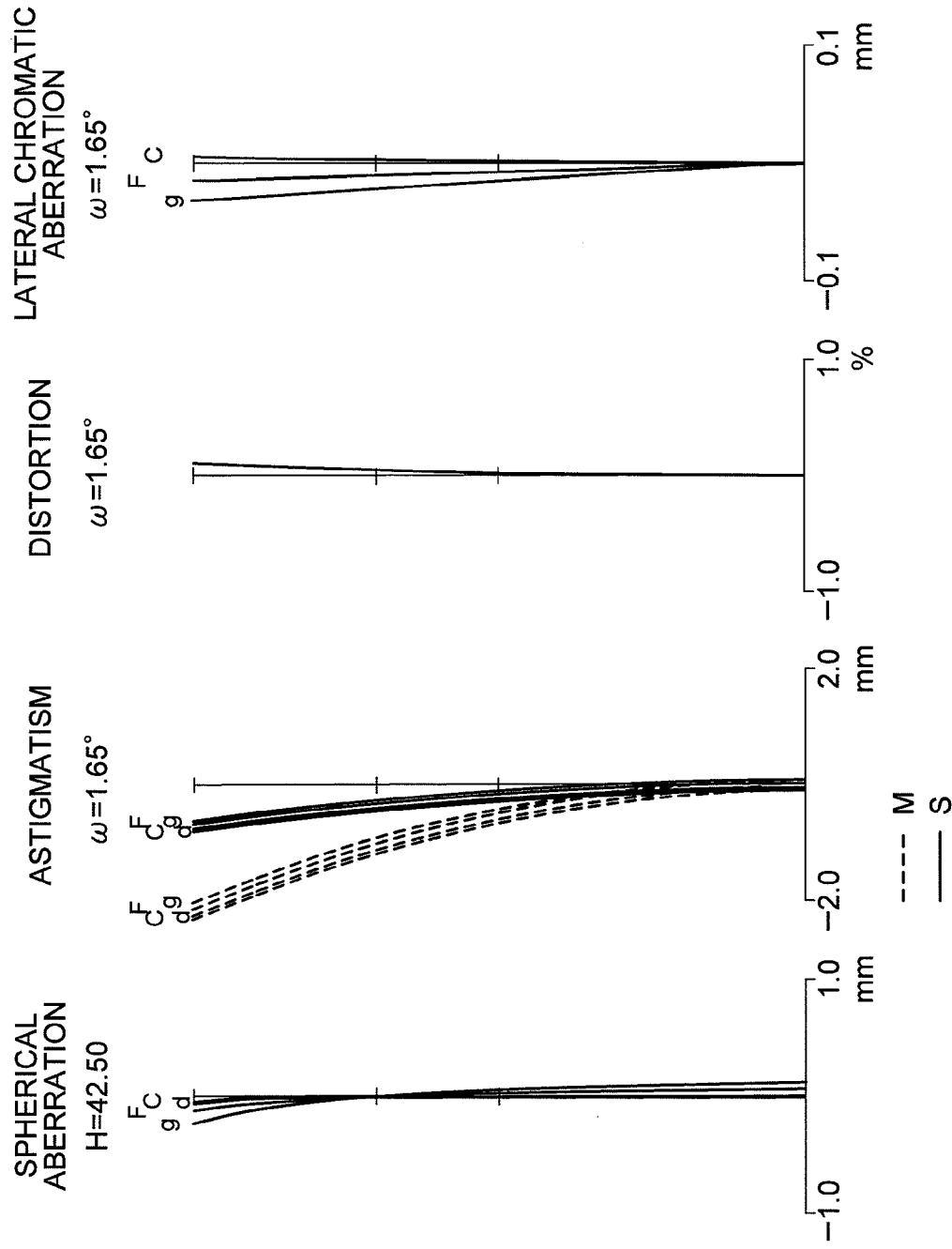
FIG. 13 shows graphs showing various aberrations of the telescope optical system according to Example 6.

As shown above, Example 6 satisfies conditional expression (1). FIG. 13 shows graphs regarding Example 6 showing various aberrations. As is apparent from the respective graphs shown in FIG. 13, Example 6 shows superb optical performance as a result of good corrections to various aberrations.

Example 7

Figure 14:
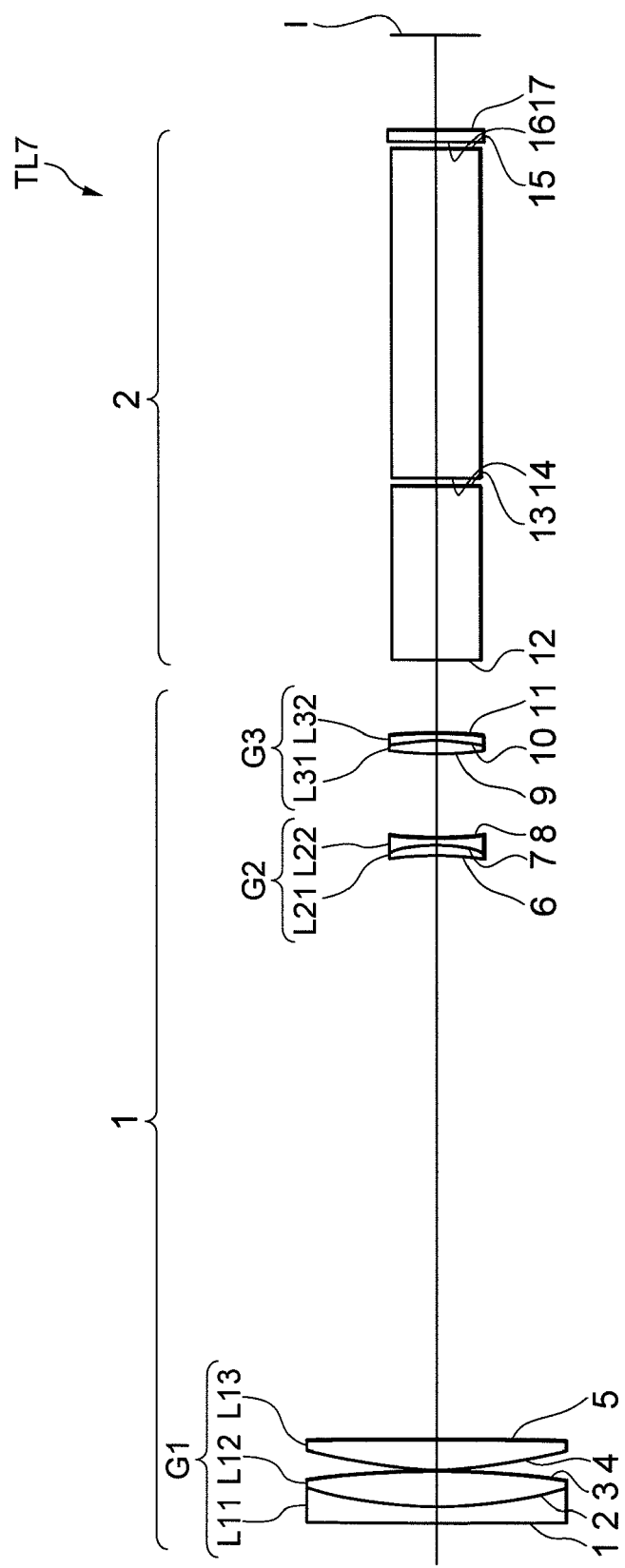
FIG. 14 is a schematic diagram showing a construction of a telescope optical system according to Example 7.

Lastly, a telescope optical system TL7 shown in FIG. 14 is explained as Example 7. The telescope optical system TL7 shown in FIG. 14 is composed of, in order from an object side, an objective lens 1, an erecting prism 2 and an unillustrated eyepiece 3. The objective lens 1 is composed of, in order from the object side, a first lens group G1, a second lens group G2 and a third lens group G3. The first lens group G1 is composed of, in order from the object side, a cemented lens constructed by a negative meniscus lens L11 having a convex surface facing the object side cemented with a double convex lens L12, and a positive meniscus lens L13 having a convex surface facing the object side. The second lens group G2 is composed of a cemented lens constructed by a positive meniscus lens L21 having a concave surface facing the object side cemented with a double concave lens L22. The third lens group G3 is composed of a cemented lens constructed by a double convex lens L31 cemented with a negative meniscus lens L32 having a concave surface facing the object side.

Various values associated with the telescope optical system TL7 according to Example 7 are listed in Table 7.

TABLE 7

[Lens Data]

| m | r | d | nd | vd |
|---|---|---|---|---|
| 1 | 2851.600 | 4.500 | 1.77279 | 49.5 |
| 2 | 166.500 | 12.000 | 1.49782 | 82.5 |
| 3 | −308.450 | 0.500 | | |
| 4 | 146.600 | 9.000 | 1.49782 | 82.5 |
| 5 | 1411.027 | 194.632 | | |
| 6 | −135.380 | 4.000 | 1.72825 | 28.3 |
| 7 | −43.874 | 2.000 | 1.62374 | 47.1 |
| 8 | 90.100 | 27.581 | | |
| 9 | 99.350 | 4.500 | 1.51823 | 58.9 |
| 10 | −82.480 | 2.000 | 1.64769 | 33.9 |
| 11 | −310.750 | 24.097 | | |
| 12 | 0.000 | 57.370 | 1.51680 | 64.1 |
| 13 | 0.000 | 2.000 | | |
| 14 | 0.000 | 107.720 | 1.51680 | 64.1 |
| 15 | 0.000 | 3.000 | | |

TABLE 7-continued

| 16 | 0.000 | 3.000  | 1.51680 | 64.1 |
| 17 | 0.000 | 31.400 |         |      |

[Focal Length Data]

f1 = 300
f2 = −100

[Value for Conditional Expression]

(1) f1/(−f2) = 3.0

Figure 15:
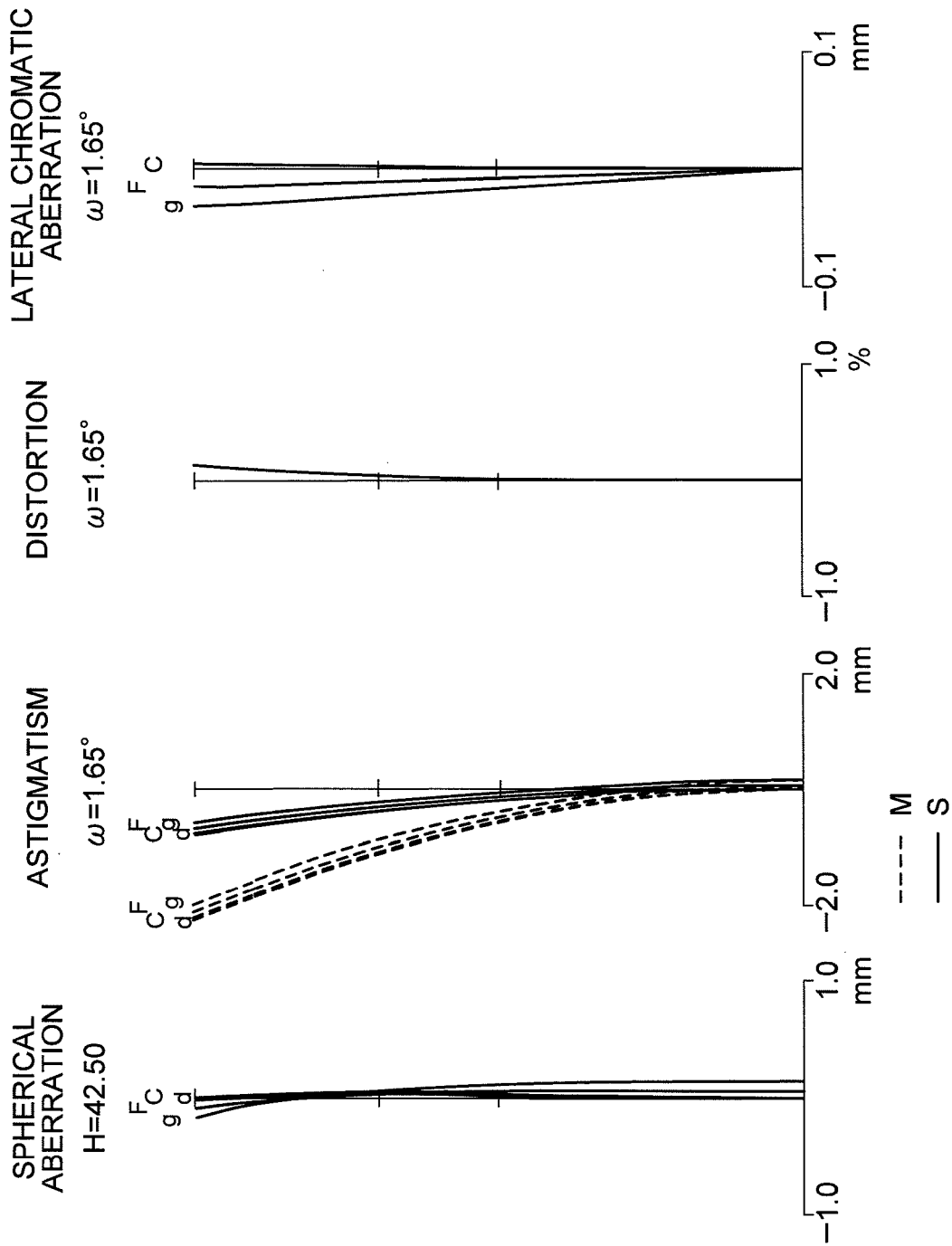
FIG. 15 shows graphs showing various aberrations of the telescope optical system according to Example 7.

As shown above, Example 7 satisfies conditional expression (1). FIG. 15 shows graphs regarding Example 7 showing various aberrations. As is apparent from the respective graphs shown in FIG. 15, Example 7 shows superb optical performance as a result of good corrections to various aberrations.

Then, a working state of a telescope TL using the telescope optical system TL1 according to Example 1 is explained with reference to FIG. 16.

Figure 16:
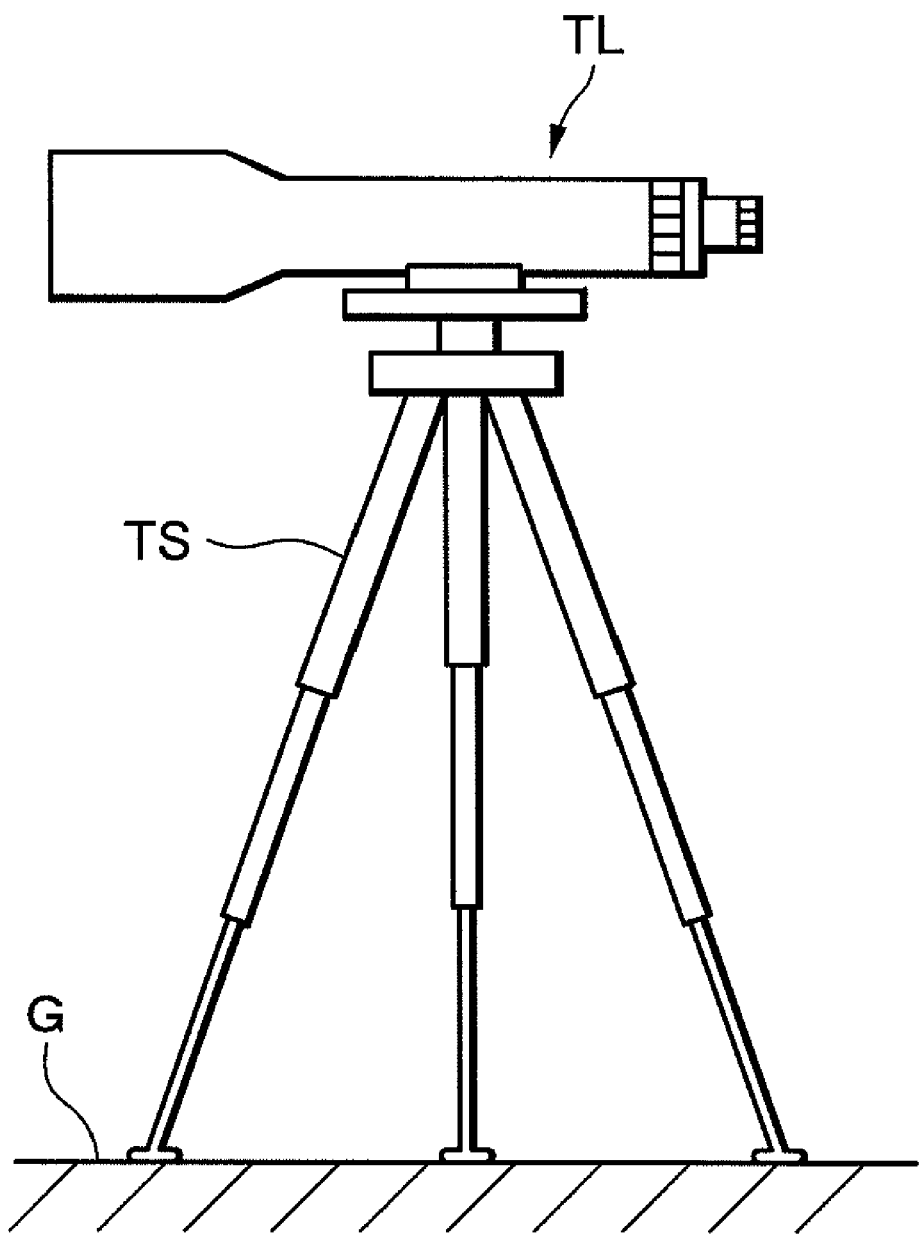
FIG. 16 is a diagram showing an example for using a telescope equipped with the telescope optical system according to the present embodiment in the field.

As shown in FIG. 16, the telescope TL is mainly used for observing birds (bird watching), animals or flowers in the field. On this occasion, the telescope TL is used with being placed on or fixed to a holding member such as a tripod TS in order to prevent vibration or blurring.

When a user observes an object to be observed with a telescope TL being fitted to a tripod TS and set up to the ground G, it is liable to happen that even if the user does not touch the telescope, vibration of the observation movement or vibration from a third person transmit to the telescope TL through the tripod TS, so that the image of the object to be observed is blurred to become difficult to be observed for the observer.

Moreover, upon observing birds or animals in the field, the telescope TL is sometimes placed on or fixed to a tripod TS or a wooden wall in an observation shed or an observation tent for observing under cover. At times like this, since the place where the tripod TS is set is unstable, unexpected vibrations are transmitted to the tripod TS by external factors such as movement of people or wind, so that the image of the object to be observed may be blurred.

Since the telescope optical system TL1 is a best-suited telescope TL for solving the problem with having the vibration reduction lens system for compensating the above-described image blur, the telescope has an effect that the image to be observed can be excellently observed with compensating the image blur of the image to be observed caused by unexpected vibration other than the user (for example, vibration from a nearby person, vibration by a wind, or vibration transmitted through the building) upon using the telescope being fixed to the tripod TS.

Moreover, it is needless to say that the telescope optical system TL1 used for the telescope TL is not limited to Example 1, and any one of Examples 2 through 7 can similarly be used. Furthermore, the holding member that holds the telescope TL is not limited to a tripod, and a holding member (monopod) having a single leg may be used, and an upper surface of a wall, a stump, or a place between two branches of a tree may be used.

What is claimed is:

1. A telescope optical system comprising, in order from an object side:
    an objective lens;
    an erecting prism; and
    an eyepiece;
    the objective lens comprising, in order from the object side, a first lens group having positive refractive power, a second lens group having negative refractive power, and a third lens group having positive refractive power,
    the first lens group being disposed, in order from the object side, a negative lens, a positive lens, and a positive lens,
    the objective lens of the telescope optical system forming an image of an object between the erecting prism and the eyepiece,
    focusing being carried out by moving the second lens group along an optical axis,
    an image position being movable by moving the third lens group in a direction perpendicular to the optical axis, and
    the following conditional expression being satisfied:
        $1.5 < f1/(-f2) < 4$ where f1 denotes a focal length of the first lens group, and f2 denotes a focal length of the second lens group.

2. The telescope optical system according to claim 1, wherein the second lens group includes a positive lens and a negative lens, and the third lens group includes a positive lens and a negative lens.

3. The telescope optical system according to claim 1, wherein an optical system composed of the first lens group and the second lens group is substantially an afocal system.

4. A telescope optical system used in a telescope for making enlarged observation of an object to be observed with being placed on or fixed to a telescope holder in a field,
    the telescope optical system comprising, in order from an object side:
    an objective lens;
    an erecting prism; and
    an eyepiece;
    the objective lens comprising, in order from the object side, a first lens group having positive refractive power, a second lens group having negative refractive power, and a third lens group having positive refractive power,
    the first lens group being disposed, in order from the object side, a negative lens, a positive lens, and a positive lens,
    the objective lens of the telescope optical system forming an image of an object between the erecting prism and the eyepiece,
    focusing being carried out by moving the second lens group along an optical axis,
    an image position being movable by moving the third lens group in a direction perpendicular to the optical axis, and
    the following conditional expression being satisfied:
        $1.5 < f1/(-f2) < 4$ where f1 denotes a focal length of the first lens group, and f2 denotes a focal length of the second lens group.

5. The telescope optical system according to claim 4, wherein the second lens group includes a positive lens and a negative lens, and the third lens group includes a positive lens and a negative lens.

6. The telescope optical system according to claim 4, wherein an optical system composed of the first lens group and the second lens group is substantially an afocal system.

* * * * *